United States Patent [19]
Popp

[11] Patent Number: 5,341,232

[45] Date of Patent: Aug. 23, 1994

[54] STAR-SHAPED NETWORK FOR DATA COMMUNICATION BETWEEN STATIONS

[75] Inventor: Wolfgang Popp, Darmstadt, Fed. Rep. of Germany

[73] Assignee: Licentia Patent-Verwaltung-GmbH, Frankfurt A.M., Fed. Rep. of Germany

[21] Appl. No.: 741,412

[22] PCT Filed: Feb. 20, 1989

[86] PCT No.: PCT/EP89/00156

§ 371 Date: Aug. 12, 1991

§ 102(e) Date: Aug. 12, 1991

[87] PCT Pub. No.: WO90/09710

PCT Pub. Date: Aug. 23, 1990

[51] Int. Cl.⁵ .......................................... H04B 10/20
[52] U.S. Cl. ................... 359/120; 359/121; 359/139; 359/178
[58] Field of Search ............... 370/94.3; 359/120, 121, 359/178, 139

[56] References Cited

U.S. PATENT DOCUMENTS

| 4,516,272 | 5/1985 | Yano | 359/136 |
| 5,073,982 | 12/1991 | Viola | 359/120 |

FOREIGN PATENT DOCUMENTS

| 0179550 | 8/1986 | European Pat. Off. | 359/120 |
| 0190662 | 8/1986 | European Pat. Off. | 359/120 |
| 8810538 | 12/1988 | World Int. Prop. O. | 359/120 |

Primary Examiner—Leslie Pascal
Attorney, Agent, or Firm—Ware, Fressola, Van Der Sluys & Adolphson

[57] ABSTRACT

The invention concerns a process for data transmission between stations in a star-shaped network in which star couplers are arranged at the branches of the network. The active, asymmetrical star coupler used in the network transmit flows of signals received at the input of any port only to the outputs of all the other ports. The receivers of the other ports are blocked against incoming signals for at Least the duration of the flows of signals.

6 Claims, 1 Drawing Sheet

STAR-SHAPED NETWORK FOR DATA COMMUNICATION BETWEEN STATIONS

TECHNICAL FIELD

The present invention relates to a star-shaped network for data transmission between stations comprising star couplers arranged at the branchings of the network.

BACKGROUND OF THE INVENTION

Networks for data communication may be equipped with passive and/or active star couplers between communication channels, Passive star couplers are used in optical communication networks. A passive star coupler is defined as having no amplifying or regenerating components therefore needing no electrical energy. The power of the optical flow of data is split by optical means. A star coupler is provided with ports, each port is provided with an input and an output. The star coupler is provided with as many inputs as outputs.

Each single station of the network is connected by two light waveguides labeled LWL in the following, to the star coupler. One LWL is transporting data to be received while the other LWL is transporting data to be transmitted by the station. A pair of these LWLs is associated to a port of the star coupler. The number of ports of the star coupler and the number of stations of the network are the same. The signals having power P and supplied to the input of a port by a LWL are split into nearly equal amounts by the order of magnitude of P/n (without considering internal coupling Losses) to the outputs of the star coupler. From the outputs the optical signals are transmitted on one of the n LWL to a receiver installed in one of the n stations of the network.

The output of that port whose input receives incoming signals is provided by the same amount of power as the outputs of all other ports, Star couplers of this type are designated "symmetrical" in the following if 1. The number of inputs is equal to the number of outputs, and
2. the optical power supplied to the input of any port X is split nearly equally among the outputs of all ports i.e. to the output of the port X too.

It is essential that the maximum working range of transmission i.e. the maximum distance between two stations, Lmax, depends on the number of ports of the star coupler, i.e. the number of stations of the network.

For optical data networks symmetrical active star couplers may be used too, the definition of symmetry mentioned above is equally valid. Such a star coupler is provided with n ports, each port being provided by one input (with an optical receiver) and one output (with an optical transmitter). Therefore the star coupler is provided with as many inputs as outputs. A star coupler as mentioned above is defined in accordance with the corresponding passive star coupler as a symmetrical active star coupler.

The star coupler as mentioned above is symmetrical because it is provided by as many inputs as outputs and because each output including the output of that port whose input receives the optical signals is fed by the same amount of signal power. The star coupler is active because all received optical signals are converted to electrical signals, regenerated with respect to Level and timing, fed to all outputs by an electronic circuit and retransferred at the outputs in optical signals and because electrical energy is required for these steps.

It is essential that the maximum working range of the network i.e. the maximum distance between two stations, Lmax, is independent of the number of ports of the star connector, i.e. the number of stations, if an active star coupler is used.

Networks may be provided with active and passive star couplers. Passive star couplers are safe against failure to a high degree.

However passive star couplers are suitable for networks with a limited range and number of stations only. Active star couplers are suitable for networks of very large working range and many stations.

Active star couplers are equipped with many opto-electronic converters and electronic circuits rendering them more expensive as compared to passive couplers in general. Moreover there are additional provisions necessary to increase safety against failure. On account of these disadvantages it is not reasonable for large, extended area networks having many stations and large ranges of transmission to use one star coupler exclusively though this might be possible in principle: A single active star coupler to which all stations of a network are connected will require Large precautionary measures to increase safety as well as large expenses for cabling: Several stations which are located close to each other e,g. forming clusters, would have to be connected to the distantly located active coupler by individual light waveguides. It is more convenient for large networks to provide several star couplers not only active but also passive ones to include the advantages of passive star couplers too:

Several stations are connected in groups of typically 8 possibly more, e.g. 16 or 32 stations by a passive star coupler. Several of these subnetworks having passive star couplers are connected to each other by an active star coupler.

Several networks of this type provided with active star couplers are connected themselves in groups of e.g. 8 networks by passive star couplers and so on. In this way one gets a network of cascaded active and passive star couplers. This network may conveniently be adjusted to increasing data rates and increasing stations e.g. of an industrial automation system.

For such networks having cascaded active and passive star couplers there must be solved an important problem: The message transmitted by a station must be prevented from arriving at any one of the receivers of the linked stations on several, different channels e.g. several times successively.

This will happen inevitably, if both the symmetrical passive and the symmetrical active star coupler as well are used commonly for setting up networks.

A network provided with symmetrical active and symmetrical passive star couplers used at the same time is therefore not functional.

This problem may be solved by networks provided with asymmetrical active and passive star couplers and a single symmetrical active or passive star coupler. This is accomplished by splitters and combiners which are specially designed types of the general star couplers.

A splitter is provided with n inputs and n outputs and splits the light supplied to its input equally to its n outputs. A combiner is provided with n inputs and one output and transmits each light signal supplied to one of its inputs to the common output.

Splitters and combiners are asymmetrical star couplers. They may be implemented as passive or active units. Many vendors are offering passive units. The ratio of power PE supplied to an input to the distributed power PA is for splitters and combiners in the order of magnitude as follows: PE/PA=n, in which n means the number of outputs of the splitters or combiners and internal losses are neglected. From this follows the dependance being principally the same for splitters or combiners with regard to maximal number of stations and range of a network if symmetrical passive star couplers are used.

The operating characteristic of active splitters and combiners as well as of active symmetrical star couplers consists in converting the optical signal received by an optical receiver into an electrical signal which is distributed electrically to an output or to the outputs and possibly regenerated before converting it into an optical signal in an optical transmitter at the output. Maximum range and number of stations of network provided with active splitters or combiners are not correlated.

With regard to advantages and disadvantages of active and passive splitters and combiners the above mentioned statements made for symmetrical star couplers are valid as well. In this context the problems concerning the safety against failure of active splitters and combiners must be mentioned. A splitter provided with n outputs and a combiner provided with n inputs may be combined to a so-called "splitter/combiner".

A splitter/combiner is a specially designed star coupler. It is provided with as many inputs as outputs, however it is not a symmetrical star coupler according to the above made definition because the light supplied to any one of its inputs is not split equally to all provided outputs: The light supplied to input n+1 will be distributed equally to outputs 1 to n however output n+1 will receive no light. If light is supplied to one of the inputs 1 to n, light is transmitted to output n+1 only while outputs 1 to n receive no light. Splitter/combiners are used as passive as well as active units.

Networks splitters/combiners are used to combine groups of stations or sub-networks (Parts of networks). Combining stations or sub-networks group by group according to this principle will result in an uppermost point of a hierarchical network generated by this procedure. At this uppermost point a symmetrical star coupler either passive or active will be installed depending on the star coupler (splitter/combiner) type in the next Lower level being active or passive.

Splitters/combiners are used on all levels of a hierarchical network to combine or split flow of data. In the respective levels of the hierarchy passive and active splitters/combiners are used alternatively. All data flow transmitted from below e.g. from a lower level is inevitably transmitted to a level above and never to other stations or sub-networks at the same level or a lower level directly. Vice versa flow of data received from above is inevitably transmitted below and never above. This is defined as "up-stream" or "down-stream" flow of data.

The real "turn table" for reversing the flow of data from up-stream to downstream is the uppermost point of the network, where a symmetrical star coupler is functioning as "loop-back-point".

This coupler distributes according to the above mentioned definition all signals supplied to an input to all outputs equally, to the output of that port too whose input received the signals. For the network it is essential that there exists a single symmetrical star coupler. The above described topological structure prevents circular signal currents because a receiver is supplied by a transmitted message only once.

A message which is to be transmitted to an immediately neighbouring station in the same cluster will not arrive at this station on the shortest link but has to pass up-stream all levels of the hierarchical network and will be reversed at the uppermost point before passing all levels of the hierarchical network down-stream to arrive at the neighbouring station of destination finally. Assuming a small distance between this station and the transmitting station and a distance covered through the light waveguide of approximately 3 kilometers and assuming further the message to pass up-stream and down-stream must pass through additional active splitters/combiners prone to failure or the active star connector prone to failure at the top of the network (Loopback-point), then there are many possibilities for hazards and distortions of the data communication which is an intolerable situation with regard to the direct vicinity of both stations communicating to each other. Communication between stations connected together functionally is interrupted if only one of many superior levels of network or one of the components connecting the levels, e.g. a component located far away at the loop-back-point of the network or in its neighborhood breaks down.

A second disadvantage is economical: Local area networks should be flexible e.g. they should be able to grow with increasing number of stations.

If a network is to be equipped with 8 stations e.g. in the beginning these 8 stations will be connected to a symmetrical passive star connector. If the number of stations is to be increased to 16 e.g. all 8 stations may be connected to a splitter/combiner providing two subnetworks which may be connected to an active star coupler. Therefore the passive symmetrical star coupler bought and used in the previous network is useless.

It is an object of the present invention to improve a star-shaped network for data transmission between stations being provided with symmetrical passive star couplers and asymmetrical active star couplers so that messages transmitted from any one of the stations are prevented from arriving at the same receiver on several, different channels (ways) successively.

SUMMARY OF THE INVENTION

The above and other objects are accomplished by a network arranged in different levels comprising stations or sub-networks arranged alternately in groups having passive symmetrical and active asymmetrical star couplers. A lower level of the network is provided with passive symmetrical star couplers connected to said stations. The active star couplers are provided with ports, each port having a receiver and a transmitter. The receiver of a port of each active star coupler is connected to switching means which are rendered non-conductive by signals supplied to the transmitter of the said port. Each receiver of a port of each active star coupler is connected to the transmitters only of the other ports of the star coupler. For active star couplers there are used only asymmetrical units which have the following properties A and B, Property A: The signals (messages) supplied to the input of any port X shall be transmitted directly to the outputs of all other ports except port X.

Property B: The signals (messages) transmitted to the outputs of the various ports shall interrupt each possible flow of data to the receiver E of the port for the duration T of the signal and a predetermined duration in excess of that duration by providing a barrier for return signals.

The invention has the following advantages: A message sent from a station to an immediately adjacent station arrives at this station on the shortest channel via the common star coupler, which is installed in the lowest level of the topology of the network.

The potential impairments caused by the flow of signals passing all levels of the hierarchy and the components connecting the levels are therefore omitted. The whole network above the passive star coupler may collapse: Nevertheless the single stations within their "isles" e.g. sub-networks will maintain their communication. The passive star couplers are not provided with electronic circuits or intelligence. They distribute messages to the outputs only.

Therefore they are safe in operation and not expensive. The active star coupler is simple and unsophisticated. Networks provided with active and passive star couplers operate more reliably.

One more advantage is economically for local area networks (LANs). The property of flexibility required often, e.g. the possibility of LANs to grow with increasing number of stations, will be accomplished inexpensively: If there is a network with e.g. 8 stations only, these 8 stations will be connected by a passive, symmetrical star coupler according to the rule mentioned above.

If the number of stations is increasing, e.g. to 16 stations, the second cluster of the 8 stations added will be also connected to a passive, symmetrical star coupler according to the rule.

Now there are sub-networks which will be connected to an asymmetrical active star coupler. Therefore it is not necessary to remove and make obsolete an expensive star coupler (splitter/combiner) bought previously.

BRIEF DESCRIPTION OF THE DRAWINGS

The invention will now be described in greater detail with reference to an embodiment thereof that is illustrated in a drawing and will reveal further details, features and advantages.

It is shown in

BEST MODE FOR CARRYING OUT THE INVENTION

Figure 1:
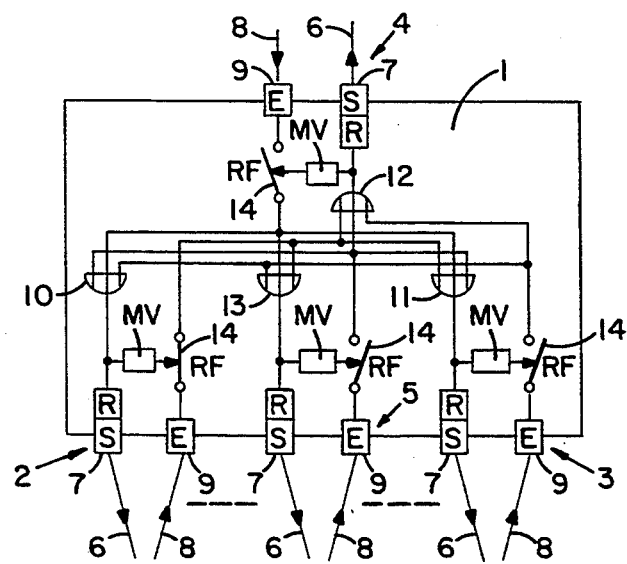
FIG. 1 an active asymmetrical star coupler.

In FIG. 1 an active, asymmetrical star coupler 1 is provided with ports 2, 3, 4, and 5. There may be more ports. Each port 2 to 5 is provided with a transmitter connected to a light waveguide 6 and a receiver 9 connected to a light waveguide 8, In front of the transmitter 7 there is a regenerator, labelled R, which is connected to an OR-gate. According to the number of ports there are four OR-gates 10, 11, 12, 13. The inputs of the OR-gates 10 to 13 are connected to regenerators R such that there is no connection from the transmitter to the receiver of the same port.

The device shown in FIG. 1 functions as follows. Assume a signal containing data and arrives after a transmitting interval at the receiver 9 of port 2.

The star coupler 1 is designed not to couple data directly to the transmitter of port 2. One more feature of the star coupler 1 is the following: The flow of signals distributed to the transmitters 7 of all other ports 3, 4, 5 activates blocking devices for preventing return flow which are switching means 14 connected to the receivers 9. The switching means are rendered nonconductive by the signal supplied to the transmitter 7 respectively or by a control signal generated for at least the duration of the flow of data.

The regenerator (repeater R) shown in in FIG. 1 is optional on the one hand and on the other hand it will not be implemented individually for each port if installed; rather the regeneration will be generated in a central unit common to all ports. The Label R in the figure is to indicate that there are output signals which are possibly regenerated.

Figure 2:
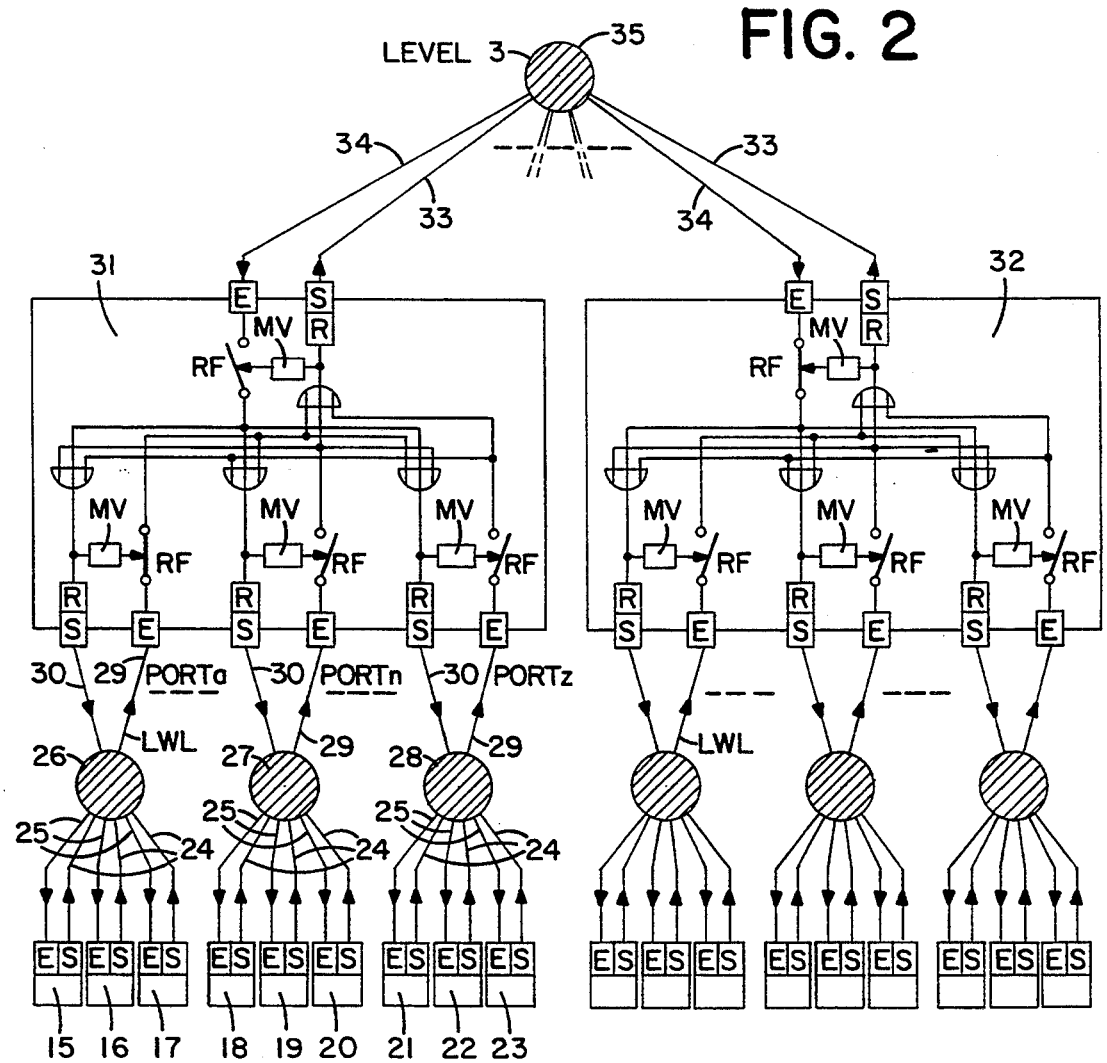
FIG. 2 a circuit diagram of a network provided with stations and passive symmetrical star couplers as well as active, asymmetrical star couplers.

In FIG. 2 there is shown a principal structure of a network. The network shown in FIG. 2 is provided with stations some of them are labeled 15, 16, 17, 18, 19, 20 and 21, 22, 23. Each station, e.g. 15 to 23 is provided with a transmitter labeled S and a receiver labeled E both of which are connected to Light waveguides which are labeled 24, 25 at all stations.

In a first Level of the network symmetrical, passive star couplers 26, 27, 28 are connected to three stations 15, 16, 17 or 18, 19, 20 or 21, 22, 23 respectively. Groups of stations 15, 16, 17 or 18, 19, 20 or 21, 22, 23 form a cluster respectively.

Light waveguides 29, 30 one for the direction of transmitting and one for the direction of receiving and provided with the same labels for star couplers extend from star couplers 26, 27, 28 to an active, asymmetrical star coupler 31 which is designed as shown in FIG. 1. A second active star coupler 32 is designed as shown in in FIG. 1. To the asymmetrical star coupler 32 there are associated passive, symmetrical star couplers similar to the star complex 26, 27, and 28 associated to star coupler 31 and not labeled in the drawings. These passive symmetrical star couplers are again connected to stations not labeled in the drawing.

There are shown 3 stations for each passive star coupler, however there may be more or less stations provided. The passive star couplers 26 to 28 are commercially available optical units.

The star couplers 31, 32 are connected via two light waveguides 33, 34 each to another passive, symmetrical star coupler 35 which is installed in the third level of the network, The star couplers 31, 32 are installed in the second level of the network.

If e.g. the station 15 transmits a flow of data this flow reaches the stations 16, 17 via the star coupler 26. The flow of data reaches the stations 18 to 22 via the star coupler 31. The stations connected to the star coupler 32 receive the flow of data via the star coupler 35.

It is essential that the stations are grouped either by passive symmetrical star couplers or by active asymmetrical star couplers provided with blocking means for return flow such that a signal arriving from a lower level of the hierarchical network to the next higher star coupler is reversed by this very star coupler to the stations or subnetworks of this mentioned lower level too, i.e. is not transmitted to the higher level of the hierarchy only.

The hazard of a return flow of the signal currents is prevented by the blocking devices for return flow. The blocking device may be activated by a monostable multivibrator triggered at the beginning of a flow of data and providing an output signal at least for the duration of the flow of data. This kind of device is suitable for networks e.g. designed to transmit flow of signals e.g. messages of equal duration. If messages of different duration are transmitted retriggerable monostable multivibrators may be used.

The problem of preventing circulating signal currents is therefore solved by the structure and the design of the network, i.e. each receiver is supplied by a message transmitted only once. The network shown in FIG. 2 is specially suitable for a network operating according to the token-bus-principle.

I claim:

1. A star-shaped network for data communication between stations comprising star couplers at branchings, said network being arranged in different levels, said levels comprising stations or sub-networks arranged alternatively in groups having passive symmetrical and active asymmetrical star couplers, said network having a lower level provided with passive symmetrical star couplers connected to said stations; said active star couplers being provided with ports, each port having a receiver and a transmitter, said receiver of said port of each active star coupler being connected to switching means which are rendered nonconductive by signals supplied to the corresponding transmitter of said port, and said receiver of each port of each active star coupler being connected to said transmitters of only the other ports of the same active star coupler.

2. A network according to claim 1, wherein light waveguides are connected to said transmitters and said receivers.

3. A network according to claim 1, wherein regenerators are connected in series to said transmitters.

4. A network according to claim 1, wherein one of said regenerators of each active star couplers is common to all ports of said star coupler, said regenerator being supplied with all signals to be transmitted by said star coupler.

5. A network according to claim 1, wherein messages of certain duration are transmitted in said network, said switching means connected in said active, asymmetrical star couplers, and said switching means including a monostable multivibrator having an input interconnected with the transmitter of the same port to which the switching means is connected, the monostable multivibrator upon sensing a message, generates a pulse having a pulse-width for causing the switching means to render the receiver nonconductive, said pulse-width at least longer than the duration of the message.

6. A network according to claim 1, wherein communication is provided in said network by a token-passing bus procedure.

* * * * *